(12) United States Patent
Shin et al.

(10) Patent No.: US 12,320,964 B2
(45) Date of Patent: *Jun. 3, 2025

(54) OPTICAL IMAGING DEVICE

(71) Applicant: Samsung Electro-Mechanics Co., Ltd., Suwon-si (KR)

(72) Inventors: Kil Soo Shin, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,003

(22) Filed: Jan. 19, 2024

(65) Prior Publication Data

US 2024/0168269 A1  May 23, 2024

Related U.S. Application Data

(63) Continuation of application No. 17/163,948, filed on Feb. 1, 2021, now Pat. No. 11,921,269.

(30) Foreign Application Priority Data

Nov. 2, 2020   (KR) .................. 10-2020-0144092

(51) Int. Cl.
```
G02B 17/08      (2006.01)
G02B 9/60       (2006.01)
G02B 13/00      (2006.01)
G02B 27/00      (2006.01)
```
(52) U.S. Cl.
CPC .......... *G02B 17/0804* (2013.01); *G02B 9/60* (2013.01); *G02B 13/0045* (2013.01); *G02B 13/007* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 4,523,816 A | 6/1985 | Kreitzer | |
| 5,114,238 A * | 5/1992 | Sigler | G02B 17/0856 359/728 |
| 5,592,329 A | 1/1997 | Ishiyama et al. | |
| 5,973,858 A | 10/1999 | Sekita | |
| 7,046,459 B1 | 5/2006 | Shafer et al. | |

(Continued)

FOREIGN PATENT DOCUMENTS

| | | |
|---|---|---|
| CN | 101473261 A | 7/2009 |
| CN | 110515189 A | 11/2019 |

(Continued)

OTHER PUBLICATIONS

Chinese Office Action Issued on Mar. 29, 2024, in Counterpart Chinese Patent Application No. 202110767707.5 (5 Pages in English, 8 Pages in Chinese).

(Continued)

*Primary Examiner* — Darryl J Collins
(74) *Attorney, Agent, or Firm* — NSIP Law

(57) ABSTRACT

An optical imaging system includes a first lens, a second lens, a third lens, a fourth lens, and a fifth lens, disposed in order from an object side, and a first reflection member and a second reflection member, disposed on an object side of the first lens, each having a freeform surface.

15 Claims, 6 Drawing Sheets

(56) References Cited

U.S. PATENT DOCUMENTS

| | | | |
|---|---|---|---|
| 7,082,001 B2 * | 7/2006 | Vizgaitis | G02B 17/0856 359/729 |
| 7,630,627 B2 | 12/2009 | Matsuda | |
| 2002/0167737 A1 | 11/2002 | Perrin et al. | |
| 2004/0156117 A1 | 8/2004 | Takaura et al. | |
| 2006/0092524 A1 | 5/2006 | Konno | |
| 2010/0238568 A1 | 9/2010 | Togino et al. | |
| 2014/0063619 A1 | 3/2014 | Lai | |
| 2014/0211330 A1 | 7/2014 | Matsumoto et al. | |
| 2015/0370048 A1 * | 12/2015 | Takano | G02B 13/16 359/728 |
| 2016/0161718 A1 | 6/2016 | Koreeda | |
| 2016/0238821 A1 | 8/2016 | Liao et al. | |
| 2017/0059836 A1 | 3/2017 | Takano | |
| 2017/0139314 A1 | 5/2017 | Huang et al. | |
| 2018/0224633 A1 | 8/2018 | Wu et al. | |
| 2019/0219804 A1 | 7/2019 | Uchida | |
| 2020/0033570 A1 | 1/2020 | Amano | |
| 2020/0233182 A1 | 7/2020 | Liao et al. | |
| 2020/0249444 A1 | 8/2020 | Wu et al. | |

FOREIGN PATENT DOCUMENTS

| | | |
|---|---|---|
| JP | 2004-258620 A | 9/2004 |
| JP | 2013-15600 A | 1/2013 |
| JP | 2016-75848 A | 5/2016 |
| JP | 2020-24359 A | 2/2020 |
| JP | 2020-98228 A | 6/2020 |
| KR | 10-2017-0059625 A | 5/2017 |
| TW | 201716824 A | 5/2017 |
| WO | WO 2020/129398 A1 | 6/2020 |

OTHER PUBLICATIONS

Korean Office Action issued on Nov. 8, 2023, in counterpart Korean Patent Application No. 10-2023-0074990 (7 pages in English, 6 pages in Korean).

Korean Office Action issued on Jun. 29, 2022, in counterpart Korean Patent Application No. 10-2020-0144092 (6 pages in English and 5 pages in Korean).

Taiwanese Office Action issued on Nov. 2, 2021, in counterpart Taiwanese Patent Application No. 110104342 (4 pages in English and 4 pages in Mandarin).

U.S. Appl. No. 17/163,948, filed Feb. 1, 2021, Kil Soo Shin et al., Samsung Electro-Mechanics Col, Ltd.

Korean Office Action issued on Jul. 25, 2024, in counterpart Korean Patent Application No. 10-2023-0074990 (8 pages in English, 6 pages in Korean).

* cited by examiner

OPTICAL IMAGING DEVICE

CROSS-REFERENCE TO RELATED APPLICATIONS

This application is a Continuation Application of U.S. patent application Ser. No. 17/163,948, filed on Feb. 1, 2021, now U.S. Pat. No. 11,921,269 issued on Mar. 5, 2024, which claims the benefit under 35 USC 119 (a) of Korean Patent Application No. 10-2020-0144092 filed on Nov. 2, 2020, in the Korean Intellectual Property Office, the entire disclosure of which is incorporated herein by reference for all purposes.

BACKGROUND

1. Field

The present disclosure relates to an optical imaging system including a reflection member formed to have a free curved surface.

2. Description of the Background

A camera module may be mounted on a mobile terminal device such as a smartphone, a laptop computer, or the like. A camera module, mounted on a mobile terminal device, is usually configured to capture an image of a subject positioned within a short range. However, with frequent outdoor photographing performed through a camera module of a mobile terminal device, there is a requirement for a camera module able to capture an image of a subject positioned at a long range. However, due to a limitation in mounting space of a camera module of a mobile terminal device, it may be difficult to design a camera module and an optical imaging system able to capture a long-range image.

The above information is presented as background information only to assist in an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens, disposed in order from an object side, and a first reflection member and a second reflection member, disposed on an object side of the first lens, each having a freeform surface.

The first reflection member may have a concave reflective surface.

The second reflection member may have a convex reflective surface.

The first lens may have a convex object-side surface.
The second lens may have a concave object-side surface.
The third lens may have a convex object-side surface.
The fourth lens may have a convex object-side surface.
The fifth lens may have a concave object-side surface.

The ratio $f/fL$ may be greater than 1.40 and less than 1.80, where f is a focal length of the optical imaging system, and fL is a composite focal length of the first to fifth lenses.

The optical imaging system may further include an optical path folding member disposed on the object side of the first reflection member.

In another general aspect, an optical imaging system includes a lens group comprising a plurality of lenses disposed in order along an optical axis, an optical path folding member disposed on an object side of the lens group, and a first reflection member and a second reflection member, disposed between the optical path folding member and the lens group, each having a freeform surface, wherein $1.40 < f/fL < 1.80$, where f is a focal length of the optical imaging system, and fL is a focal length of the lens group.

The optical imaging system may further include a third reflection member disposed between the lens group and an imaging plane.

The ratio $fm1/f$ may be greater than 0.8 and less than 1.40, where fm1 is a focal length of the first reflection member.

The ratio $fm2/f$ may be greater than $-1.0$ and less than $-0.4$, where fm2 is a focal length of the second reflection member.

The absolute value of the ratio $fm1/fm2$ may be greater than 1.40 and less than 1.80.

The ratio $TL/f$ may be greater than 0.40 and less than 0.9, where TL is a distance from an object-side surface of a lens, disposed in a frontmost position of the lens group, to an imaging plane.

In another general aspect, an optical imaging system includes a reflection element disposed between a lens group and an optical path folding member configured to bend an optical path between the optical path folding member and the lens group, wherein the reflection element includes a first reflection member having positive refractive power, and wherein the lens group includes a first lens having positive refractive power.

The reflection element may further include a second reflection member having negative refractive power. The lens group may further include a second lens having negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
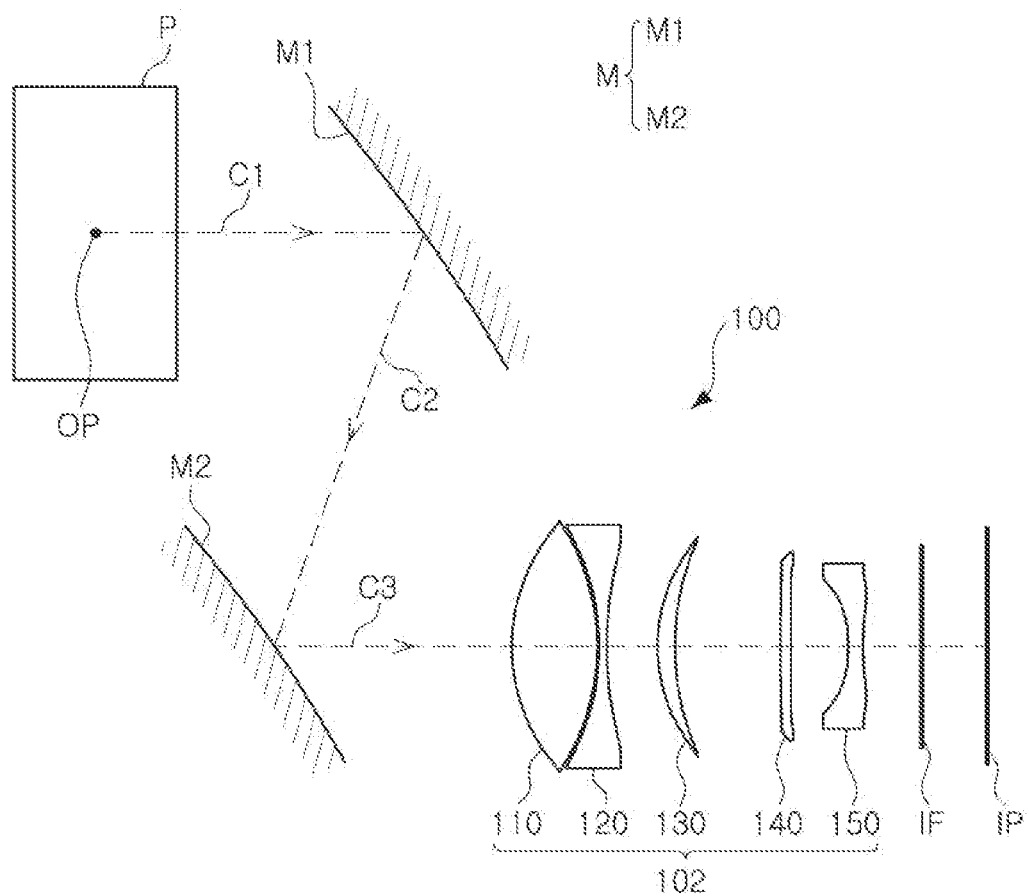
FIG. 1 is a diagram illustrating an optical imaging system according to a first example.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide an optical imaging system which may perform long-range image capturing and may allow a camera module to be miniaturized.

An optical imaging system includes a plurality of lenses disposed along an optical axis. The plurality of lenses may be spaced apart from each other by predetermined distances along the optical axis.

For example, the optical imaging system includes a first lens, a second lens, a third lens, a fourth lens, and a fifth lens, sequentially disposed in ascending numerical order along the optical axis from an object side of the optical imaging system toward an imaging plane of the optical imaging system, with the first lens being closest to the object side of the optical imaging system and the fifth lens being closest to the imaging plane.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

In the examples, a first lens refers to a lens most adjacent to an object (or a subject), and a fifth lens refers to a lens most adjacent to an imaging plane (or an image sensor). In the examples, units of a radius of curvature, a thickness, a TL (a distance from an object-side surface of a first lens (or a frontmost lens) to an imaging plane), an IMGHT (one-half of a diagonal length of an imaging plane), and a focal length are indicated in millimeters (mm). A thickness of a lens, a gap between lenses, and a TL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

An optical imaging system according to the present disclosure may adjust ray aberration of light, reaching an image sensor, using a non-rotationally symmetrical reflection member. For example, an optical imaging system may include a reflection member having a free curved surface.

An optical imaging system according to examples described herein may be mounted on a camera module for a portable terminal device. However, the application range of an optical imaging system is not limited to a camera module for a portable terminal device. In addition, an optical imaging system according to the examples described herein may be selectively applied to a plurality of camera modules. As an example, an optical imaging system may be applied to one camera module, among two or more camera modules mounted on a portable terminal device. As another example, an optical imaging system according to the examples described herein may be applied to one or more camera modules, among three or more camera modules mounted on a portable terminal device.

Hereinafter, an optical imaging system according to one or more examples will be described.

An optical imaging system according to an example may include a plurality of lenses and a plurality of reflection members. For example, the optical imaging system may include a first lens, a second lens, a third lens, a fourth lens, and a fifth lens disposed in order from an object side. In addition, the optical imaging system may include a first reflection member and a second reflection member. The first reflection member and the second reflection member may be disposed to be closer to an object than the first to fifth lenses. For example, the first reflection member and the second reflection member may be disposed on an object side of the first lens. The first reflection member and the second reflection member may be configured to facilitate aberration correction. For example, the first reflection member and the second reflection member may be formed to have a freeform surface.

Each of the first reflection member and the second reflection member may be configured to have refractive power. For example, the first reflection member may have positive refractive power because a reflective surface thereof is formed to be concave, and the second reflection member may have negative refractive power because a reflective surface thereof is formed to be convex.

The optical imaging system according to an example may further include an optical path folding member. The optical path folding member may be disposed on the object side of the first reflection member. The optical path folding member may be configured in the form of a prism, a reflective mirror, or the like.

An optical imaging system according to another example may include a lens group, an optical path folding member, and a reflection element. The lens group may include a plurality of lenses. For example, the lens group may include two or more lenses disposed in order along an optical axis. The lens group may establish a predetermined numerical relationship with the optical imaging system. For example, a ratio of a focal length f of the optical imaging system to a focal length fL of the lens group (f/fL) may be greater than 1.40 to less than 1.80. The optical path folding member may be disposed on an object side of the lens group, and may be configured to bend an optical path between an object and the lens group. The optical path folding member may be in the form of a prism. The reflection element may include a plurality of reflection members. For example, the reflection element may include a first reflection member and a second reflection member. The reflection element may be configured to have a freeform surface. For example, a reflective surface of the first reflection member and a reflective surface of the second reflection member may be formed as freeform surfaces, respectively.

Hereinafter, features of the reflection members and the lenses, constituting the optical imaging system according to the present disclosure, will be described.

Each of the first reflection member and the second reflection member may be formed to have a curved surface. For example, the first reflection member may have a concave shape, and the second reflection member may have a convex shape.

The first lens may have refractive power. One surface of the first lens may be convex. For example, the first lens may have a convex object-side surface. The first lens may have an aspherical surface. For example, both surfaces of the first lens may be aspherical. The first lens may have a predetermined refractive index. For example, the refractive index of the first lens may be 1.5 or more to less than 1.6.

The second lens may have refractive power. One surface of the second lens may be concave. For example, the second lens may have a concave object-side surface. The second lens may have an aspherical surface. For example, both surfaces of the second lens may be aspherical. The second lens may have a predetermined refractive index. For example, the refractive index of the second lens may be 1.6 or more to less than 1.7.

The third lens may have refractive power. One surface of the third lens may be convex. For example, the third lens may have a convex object-side surface. The third lens may have an aspherical surface. For example, both surfaces of the third lens may be aspherical. The third lens may have a predetermined refractive index. For example, the refractive index of the first lens may be 1.6 or more to less than 1.7. The third lens may have a predetermined Abbe number. For example, the Abbe number of the third lens may be 15 or more to less than 20.

The fourth lens may have refractive power. One surface of the fourth lens may be convex. For example, the fourth lens may have a convex object-side surface. The fourth lens may have an aspherical surface. For example, both surfaces of the fourth lens may be aspherical. The fourth lens may have a predetermined refractive index. For example, the refractive index of the fourth lens may be 1.6 or more to less than 1.7.

The fifth lens may have refractive power. One surface of the fifth lens may be concave. For example, the fifth lens may have a concave object-side surface. The fifth lens may have an aspherical surface. For example, both surfaces of the fifth lens may be aspherical. The fifth lens may have a predetermined refractive index. For example, the refractive index of the fifth lens may be 1.5 or more to less than 1.6.

A lens, constituting an optical imaging system, is formed of a material having a refractive index different from a refractive index of air. For example, the lens may be formed of a plastic material or a glass material. As described above, each of the first to fifth lenses may have an aspherical surface. An aspherical surface of a lens may be represented by Equation 1 as below:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ (Equation 1)

In equation 1, "c" is an inverse of a radius of a curvature of a respective lens, "k" is a conic constant, "r" is a distance from a certain point on an aspherical surface of the lens to an optical axis, "A" to "H" and "J" are aspheric constants, "Z" (or SAG) is a height from a certain point on an aspherical surface to an apex of the aspherical surface in an optical axis direction.

The optical imaging system may further include a filter, a stop, and an image sensor.

The filter may be disposed between the image sensor and a lens disposed to be closest to an image surface of the image sensor. The filter may block some wavelengths from incident light to improve a resolution of the optical imaging system. For example, the filter may block infrared wavelengths of incident light. The image sensor may be configured to convert an optical signal (optical image) into an electrical signal. The image surface of the image sensor may form an imaging plane disposed at the imaging plane of the optical imaging system.

The optical imaging system may further include a third reflection member, as necessary.

The third reflection member may be disposed between the lens group and the image sensor. For example, the third reflection member may be disposed between the image sensor and the fifth lens disposed to be closest to the image surface to bend an optical path between the fifth lens and the image sensor.

The optical imaging system may satisfy one or more of the following conditional expressions.

0.40<TL/f<0.90

1.40<f/fL<1.80

0.70<f/fm1<1.40

−3.0<f/fm2<−1.0

0.4<fL/fm1<0.8

−1.6<fL/fm2<−0.4

4.0<f/f1<8.0

−6.0<f/f2<−3.0

1.20<f/f3<2.0

−1.0<f/f4<2.0

−8.0<f/f5<−2.0

1.0<f/f12<1.80

−3.0<f/f345<3.0

In the above conditional expressions, TL is a distance from an object-side surface of the first lens to an imaging plane, f is a focal length of the optical imaging system, fL is a focal length of the lens group, fm1 is a focal length of the first reflection member, fm2 is a focal length of the second reflection member, f1 is a focal length of the first lens, f2 is a focal length of the second lens, f3 is a focal length of the third lens, and f4 is a focal length of the fourth lens, f5 is a focal length of the fifth lens, f12 is the combined focal length of the first lens and the second lens, and f345 is a composite focal length of the third to fifth lenses.

In the description below, various examples of an optical imaging system will be described.

Hereinafter, an optical imaging system 100 according to a first example will be described with reference to FIG. 1.

The optical imaging system 100 may include an optical path folding member P, a reflection element M, and a lens group 102.

The optical path folding member P may be disposed in a frontmost position of the optical imaging system 100. The optical path folding member P may be configured to bend a path of light incident on the optical imaging system 100. For example, the optical path folding member P may refract or reflect a path of light, incident along an optical axis OP, in a direction of a first optical axis C1 intersecting the optical axis OP. In the drawings of the optical path OP, the optical path OP may be in the direction of view and thus represented by a dot. The optical path folding member P may be configured in the form of a prism. However, the shape of the optical path folding member P is not limited to the prism. For example, the optical path folding member P may be configured in the form of a reflective mirror.

The reflection element M may be disposed between the optical path folding member P and the lens group 102. The reflection element M may bend the optical path between the optical path folding member P and the lens group 102 to reduce an external size of the optical imaging system 100. The reflection element M may include a first reflection member M1 and a second reflection member M2.

The first reflection member M1 may be configured to reflect light, emitted from the optical path folding member P, to the second reflection member M2. For example, the first reflection member M1 may reflect light, incident along the first optical axis C1, in a direction of a second optical axis C2. The first reflection member M1 may be formed to have a curved shape. For example, a reflective surface of the first reflection member M1 may be concave. The first reflection member M1 may have a freeform surface. For example, at least a portion of the reflective surface of the first reflection member M1 may be formed as a freeform surface. The first reflection member M1 may have predetermined refractive power. For example, the first reflection member M1 may have positive refractive power.

The second reflection member M2 may be configured to reflect light, incident from the first reflection member M1, to the lens group 102. For example, the second reflection member M2 may reflect light, incident along the second optical axis C2, in a direction of a third optical axis C3. The second reflection member M2 may be formed to have a curved shape. For example, a reflective surface of the second reflection member M2 may be convex. The second reflection member M2 may have a freeform surface. For example, at least a portion of the reflective surface of the second reflection member M2 may be formed as a freeform surface. The second reflection member M2 may have predetermined refractive power. For example, the second reflection member M2 may have negative refractive power.

The lens group 102 may include a plurality of lenses. For example, the lens group 102 may include a first lens 110, a second lens 120, a third lens 130, a fourth lens 140, and a fifth lens 150 disposed in order along the third optical axis C3.

The first lens 110 may have positive refractive power. The first lens 110 may have a convex object-side surface and a convex image-side surface. The second lens 120 may have negative refractive power. The second lens 120 may have a concave object-side surface and a concave image-side surface. The third lens 130 may have positive refractive power. The third lens 130 may have a convex object-side surface and a concave image-side surface. The fourth lens 140 may have positive refractive power. The fourth lens 140 may have a convex object-side surface and a concave image-side surface. The fifth lens 150 may have negative refractive power. The fifth lens 150 may have a concave object-side surface and a concave image-side surface. An inflection point may be formed on the image-side surface of the fifth lens 150.

The optical imaging system 100 includes a filter IF and an image sensor IP.

The filter IF may be disposed in front of the image sensor IP to block infrared rays, or the like, included in the incident light. The image sensor IP may include a plurality of optical sensors. The above-described image sensor IP may be configured to convert an optical signal into an electric signal.

Figure 2:
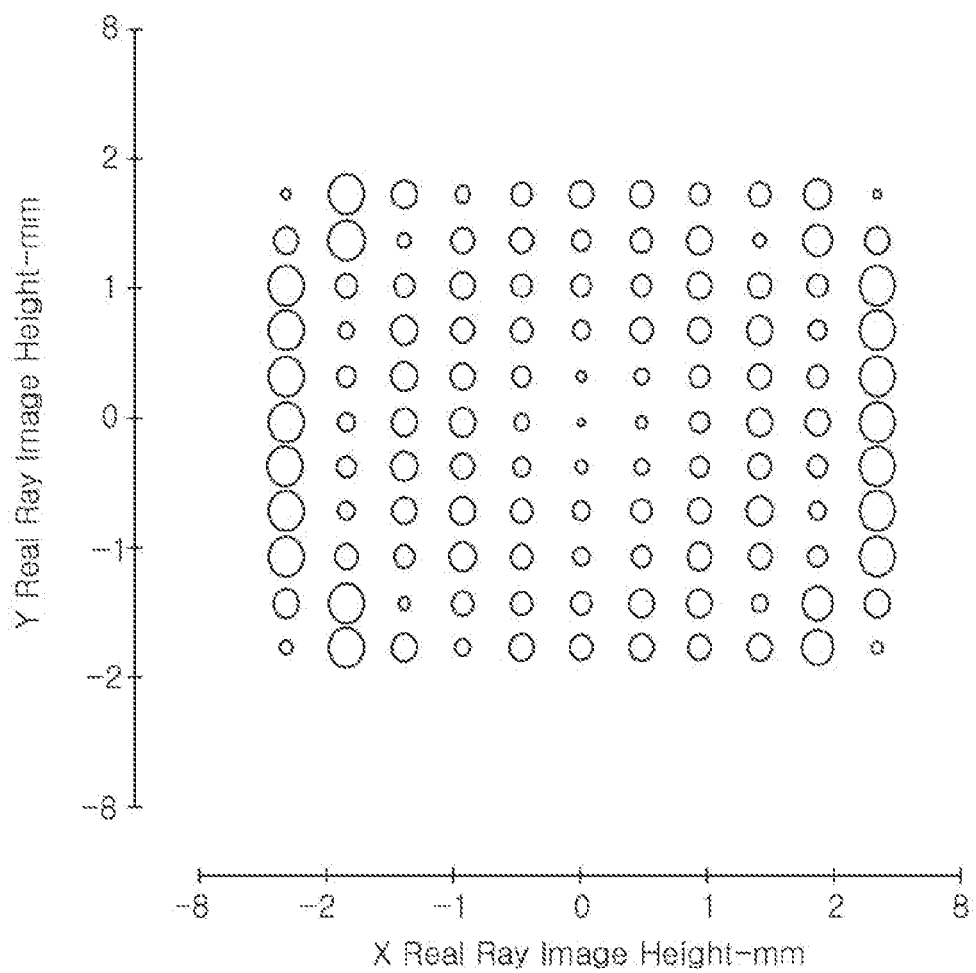
FIG. 2 is a graph illustrating distortion aberration of the optical imaging system according to the first example.

Lens characteristics of the optical imaging system 100 according to the first example are listed in Table 1, aspherical values of the optical imaging system 100 according to the first example are listed in Table 2, and FIG. 2 is a view illustrating aberration curves of the optical imaging system 100 according to the first example.

TABLE 1

| Surface No. | Note | Radius of Curvature | Thickness/ Distance | Refractive Index | Abbe Number |
|---|---|---|---|---|---|
| S1 | Prism | infinity | 2.6300 | 1.722 | 29.500 |
| S2 | | infinity | 2.6300 | | |
| S3 | | infinity | 6.6400 | | |
| S4 | First Reflection Member | −54.773 | 5.9550 | 1.298 | 100.000 |
| S5 | | infinity | 5.9550 | | |
| S6 | Second Reflection Member | 31.33 | 5.0000 | 1.298 | 100.000 |
| S7 | | infinity | 1.5000 | | |
| S8 | First Lens | 4.906 | 2.4380 | 1.534 | 55.650 |
| S9 | | −5.836 | 0.0330 | | |
| S10 | Second Lens | −7.205 | 0.2000 | 1.615 | 25.960 |
| S11 | | 8.443 | 1.4380 | | |
| S12 | Third Lens | 4.836 | 0.5000 | 1.670 | 19.240 |
| S13 | | 6.676 | 2.9800 | | |
| S14 | Fourth Lens | 12.42 | 0.3000 | 1.615 | 25.960 |
| S15 | | 162.239 | 1.6290 | | |
| S16 | Fifth Lens | −3.314 | 0.4090 | 1.544 | 56.110 |
| S17 | | 6.503 | 1.4950 | | |
| S18 | Filter | infinity | 0.2800 | 1.519 | 64.200 |
| S19 | | infinity | 1.7970 | | |
| S20 | Imaging Plane | infinity | −0.0020 | | |

TABLE 2

| Surface No. | S8 | S9 | S10 | S11 | S12 |
|---|---|---|---|---|---|
| K | 0.68593991 | 0 | 0 | 0 | 0 |
| A | 0.00034719 | −0.00008610 | −0.00378702 | −0.00226927 | 0.00079701 |
| B | 0.00000738 | 0.00042496 | 0.00123659 | 0.00038932 | −0.00047113 |
| C | −0.00000517 | −0.00007730 | −0.00020181 | −0.00003772 | 0.00010189 |
| D | 0.00000103 | 0.00000604 | 0.00001460 | −0.00000042 | −0.00000924 |
| E | −0.00000006 | −0.00000016 | −0.00000037 | 0.00000013 | 0.00000030 |

| Surface No. | S13 | S14 | S15 | S16 | S17 |
|---|---|---|---|---|---|
| K | 0 | 0 | 0 | 0 | 0 |
| A | −0.0012575 | −0.0083559 | −0.0013634 | 0.0227965 | −0.0083414 |
| B | 0.0000598 | −0.0013373 | −0.0018170 | −0.0279200 | −0.0072253 |
| C | 0.0000016 | 0.0013471 | 0.0014167 | 0.0087864 | 0.0014776 |
| D | −0.0000008 | −0.0003399 | −0.0003368 | −0.0010929 | −0.0000062 |
| E | 0.0000000 | 0.0000282 | 0.0000284 | 0.0000471 | −0.0000104 |

Figure 3:
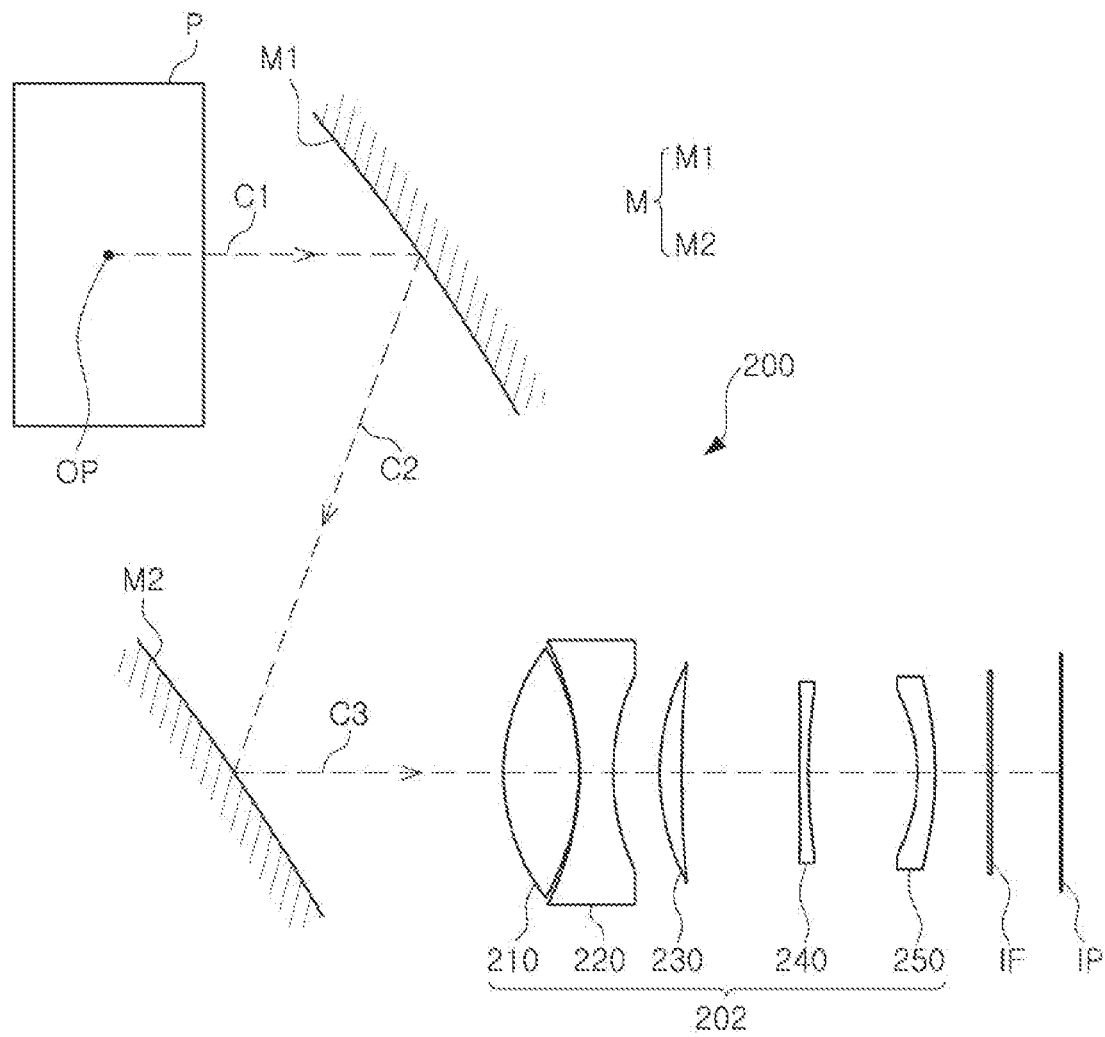
FIG. 3 is a diagram illustrating an optical imaging system according to a second example.

Hereinafter, an optical imaging system 200 according to a second example will be described with reference to FIG. 3.

The optical imaging system 200 may include an optical path folding member P, a reflection element M, and a lens group 202.

The optical path folding member P may be disposed in a frontmost position of the optical imaging system 200. The optical path folding member P may be configured to bend a path of light incident to the optical imaging system 200. For example, the optical path folding member P may refract or reflect a path of light, incident along an optical axis OP, in a direction of a first optical axis C1 intersecting the optical axis OP. The optical path folding member P may be configured in the form of a prism. However, the shape of the optical path folding member P is not limited to the prism. For example, the optical path folding member P may be configured in the form of a reflective mirror.

The reflection element M may be disposed between the optical path folding member P and the lens group 202. The reflection element M may bend an optical path between the optical path folding member P and the lens group 202 to reduce an external size of the optical imaging system 200. The reflection element M may include a first reflection member M1 and a second reflection member M2.

The first reflection member M1 may be configured to reflect light, emitted from the optical path folding member P, to the second reflection member M2. For example, the first reflection member M1 may reflect light, incident along the first optical axis C1, in a direction of a second optical axis C2. The first reflection member M1 may be formed to have a curved shape. For example, a reflective surface of the first reflection member M1 may be concave. The first reflection member M1 may have a freeform surface. For example, at least a portion of the reflective surface of the first reflection member M1 may be formed as a freeform surface. The first reflection member M1 may have predetermined refractive power. For example, the first reflection member M1 may have positive refractive power.

The second reflection member M2 may be configured to reflect light, incident from the first reflection member M1, to the lens group 202. For example, the second reflection member M2 may reflect light, incident along a second optical axis C2, in a direction of a third optical axis C3. The second reflection member M2 may be formed to have a curved shape. For example, a reflective surface of the second reflection member M2 may be convex. The second reflection member M2 may have a freeform surface. For example, at least a portion of the reflective surface of the second reflection member M2 may be formed as a freeform surface. The second reflection member M2 may have predetermined refractive power. For example, the second reflection member M2 may have negative refractive power.

The lens group 202 may include a plurality of lenses. For example, the lens group 202 includes a first lens 210, a second lens 220, a third lens 230, a fourth lens 240, and a fifth lens 250 disposed in order along the third optical axis C3.

The first lens 210 may have positive refractive power. The first lens 210 may have a convex object-side surface and a convex image-side surface. The second lens 220 may have negative refractive power. The second lens 220 may have a concave object-side surface and a concave image-side surface. The third lens 230 may have positive refractive power. The third lens 230 may have a convex object-side surface and a concave image-side surface. The fourth lens 240 may have negative refractive power. The fourth lens 240 may have a convex object-side surface and a concave image-side surface. The fifth lens 250 may have negative refractive power. The fifth lens 250 may have a concave object-side surface and a convex image-side surface. An inflection point may be formed on the image-side surface of the fifth lens 250.

The optical imaging system 200 may include a filter IF and an image sensor IP.

The filter IF may be disposed in front of the image sensor IP to block infrared rays, or the like, included in the incident light. The image sensor IP may include a plurality of optical sensors. The above-described image sensor IP may be configured to convert an optical signal into an electric signal.

Figure 4:
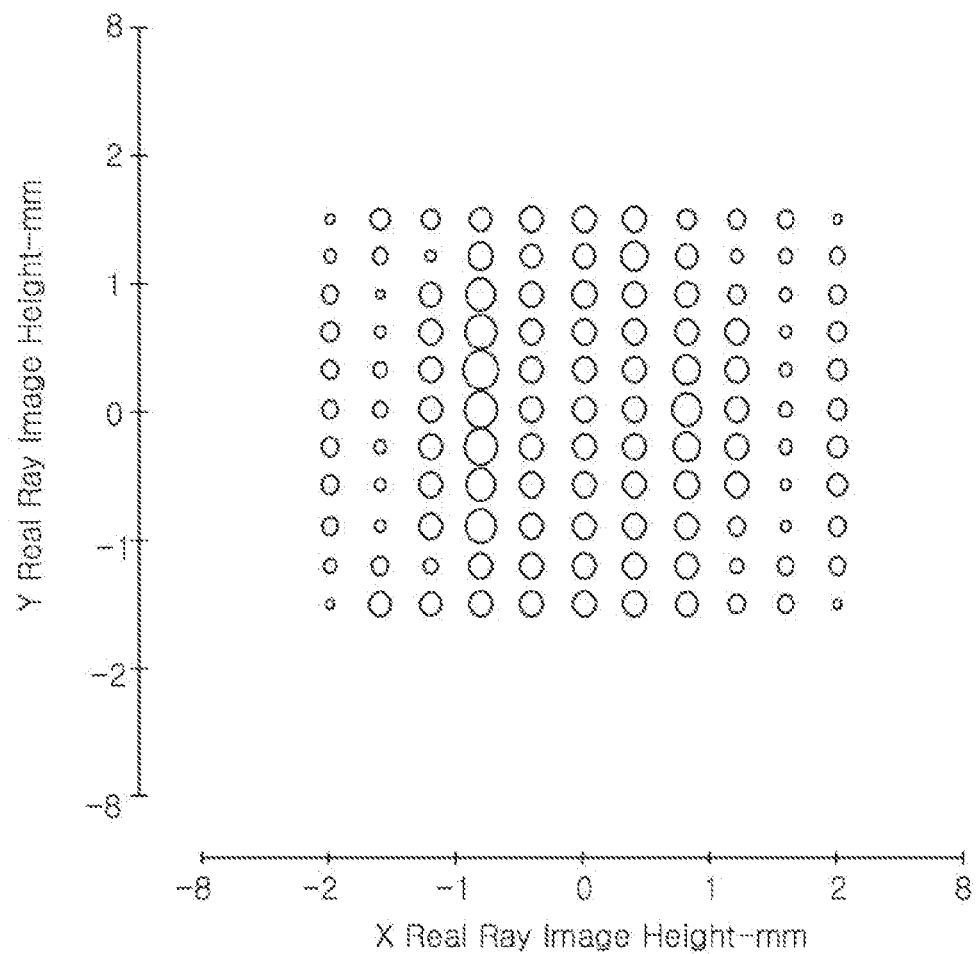
FIG. 4 is a graph illustrating distortion aberration of the optical imaging system according to the second example.

Lens characteristics of the optical imaging system 200 according to the second example are listed in Table 3, aspherical values of the optical imaging system 200 according to the second example are listed in Table 4, and FIG. 4 is a view illustrating aberration curves of the optical imaging system 200 according to the second example.

TABLE 3

| Surface No. | Note | Radius of Curvature | Thickness/ Distance | Refractive Index | Abbe Number |
|---|---|---|---|---|---|
| S1 | Prism | infinity | 2.6300 | 1.722 | 29.500 |
| S2 | | infinity | 2.6300 | | |
| S3 | | infinity | 5.0000 | | |
| S4 | First Reflection Member | −66.106 | 6.5000 | 1.298 | 100.000 |
| S5 | | infinity | 6.5000 | | |
| S6 | Second Reflection Member | 40.19 | 5.0000 | 1.298 | 100.000 |
| S7 | | infinity | 1.5134 | | |
| S8 | First Lens | 4.747 | 1.8124 | 1.534 | 55.650 |
| S9 | | −5.596 | 0.0300 | | |
| S10 | Second Lens | −7.417 | 0.8129 | 1.615 | 25.960 |
| S11 | | 5.418 | 1.1341 | | |
| S12 | Third Lens | 6.101 | 0.5191 | 1.670 | 19.240 |
| S13 | | 20.409 | 2.8518 | | |
| S14 | Fourth Lens | 16.883 | 0.2000 | 1.615 | 25.960 |
| S15 | | 12.386 | 2.6397 | | |
| S16 | Fifth Lens | −4.028 | 0.4296 | 1.544 | 56.110 |
| S17 | | −15.53 | 1.2299 | | |
| S18 | Filter | infinity | 0.2295 | 1.519 | 64.200 |
| S19 | | infinity | 1.5957 | | |
| S20 | Imaging Plane | infinity | −0.0017 | | |

TABLE 4

| Surface No. | S8 | S9 | S10 | S11 | S12 |
|---|---|---|---|---|---|
| K | 0.6859399 | 0 | 0 | 0 | 0 |
| A | 0.0004901 | 0.0001193 | −0.0043659 | −0.0041689 | −0.0009391 |
| B | −0.0000117 | 0.0006860 | 0.0015988 | 0.0012015 | 0.0004363 |
| C | −0.0000058 | −0.0001415 | −0.0003086 | −0.0002737 | −0.0001074 |
| D | 0.0000022 | 0.0000121 | 0.0000267 | 0.0000273 | 0.0000107 |
| E | −0.0000002 | −0.0000004 | −0.0000008 | −0.0000010 | −0.0000004 |

TABLE 4-continued

| Surface No. | S13 | S14 | S15 | S16 | S17 |
|---|---|---|---|---|---|
| K | 0 | 0 | 0 | 0 | 0 |
| A | −0.00212730 | −0.01136750 | −0.00631775 | −0.01175663 | −0.00927392 |
| B | 0.00042022 | 0.00024121 | 0.00106880 | 0.01196813 | 0.00189419 |
| C | −0.00008452 | 0.00093314 | 0.00065764 | −0.00453065 | −0.00012979 |
| D | 0.00000748 | −0.00030695 | −0.00024974 | 0.00080815 | −0.00005190 |
| E | −0.00000020 | 0.00003100 | 0.00002886 | −0.00005476 | 0.00000706 |

Figure 5:
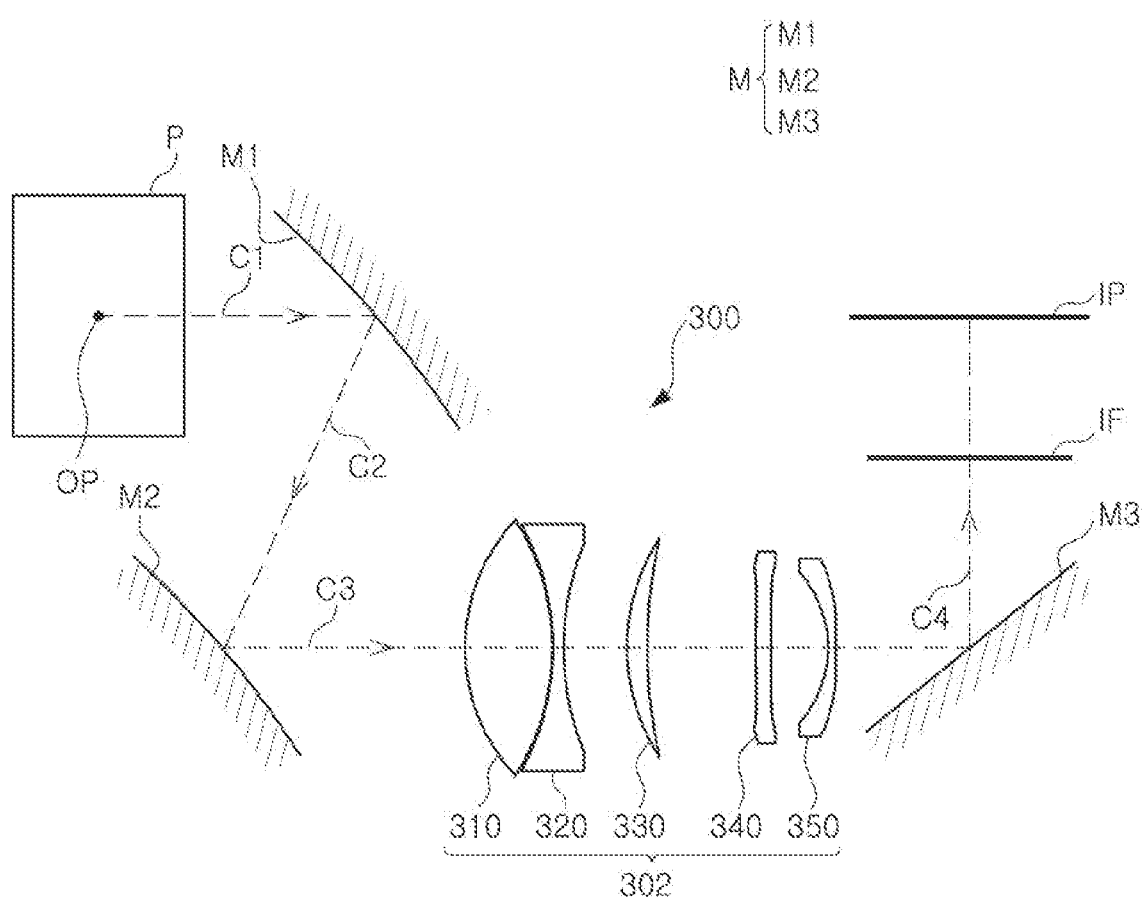
FIG. 5 is a diagram illustrating an optical imaging system according to a third example.

Hereinafter, an optical imaging system according to a third example will be described with reference to FIG. 5.

The optical imaging system 300 may include an optical path folding member P, a reflection element M, and a lens group 302.

The optical path folding member P may be disposed in a frontmost position of the optical imaging system 300. The optical path folding member P may be configured to bend a path of light incident to the optical imaging system 300. For example, the optical path folding member P may refract or reflect a path of light, incident along an optical axis OP, in a direction of a first optical axis C1 intersecting the optical axis OP. The optical path folding member P may be configured in the form of a prism. However, the shape of the optical path folding member P is not limited to the prism. For example, the optical path folding member P may be configured in the form of a reflective mirror.

The reflection element M may be disposed between the optical path folding member P and the lens group 302. The reflection element M may bend an optical path between the optical path folding member P and the lens group 302 to reduce an external size of the optical imaging system 300. The reflection element M may include a first reflection member M1 and a second reflection member M2.

The first reflection member M1 may be configured to reflect light, emitted from the optical path folding member P, to the second reflection member M2. For example, the first reflection member M1 may reflect light, incident along the first optical axis C1, in a direction of a second optical axis C2. The first reflection member M1 may be formed to have a curved shape. For example, the reflective surface of the first reflection member M1 may be concave. The first reflection member M1 may include a freeform surface. For example, at least a portion of the reflective surface of the first reflection member M1 may be formed as a freeform surface. The first reflection member M1 may have predetermined refractive power. For example, the first reflection member M1 may have positive refractive power.

The second reflection member M2 may be configured to reflect light, incident from the first reflection member M1, to the lens group 302. For example, the second reflection member M2 may reflect light, incident along the second optical axis C2, in a direction of a third optical axis C3. The second reflection member M2 may be formed to have a curved shape. For example, the reflective surface of the second reflection member M2 may be convex. The second reflection member M2 may have a freeform surface. For example, at least a portion of the reflective surface of the second reflection member M2 may be formed as a freeform surface. The second reflection member M2 may have predetermined refractive power. For example, the second reflection member M2 may have negative refractive power.

The lens group 302 may include a plurality of lenses. For example, the lens group 302 includes a first lens 310, a second lens 320, a third lens 330, a fourth lens 340, and a fifth lens 350 disposed in order along the third optical axis C3.

The first lens 310 may have positive refractive power. The first lens 310 may have a convex object-side surface and a convex image-side surface. The second lens 320 may have negative refractive power. The second lens 320 may have a concave object-side surface and a concave image-side surface. The third lens 330 may have positive refractive power. The third lens 330 may have a convex object-side surface and a concave image-side surface. The fourth lens 340 may have positive refractive power. The fourth lens 340 may have a convex object-side surface and a concave image-side surface. The fifth lens 350 may have negative refractive power. The fifth lens 350 may have a concave object-side surface and a concave image-side surface. An inflection point may be formed on the image-side surface of the fifth lens 350.

The optical imaging system 300 may further include a third reflection member M3. The third reflection member M3 may be disposed between the fifth lens 350, disposed on a rearmost side of the lens group 302, and the image sensor IP to bend an optical path. For example, the third reflection member M3 may reflect light, incident along the third optical axis C3, in a direction of a fourth optical axis C4.

The optical imaging system 300 may include a filter IF and an image sensor IP.

The filter IF may be disposed in front of the image sensor IP to block infrared rays, or the like, included in the incident light. The image sensor IP may include a plurality of optical sensors. The above-described image sensor IP may be configured to convert an optical signal into an electric signal.

Figure 6:
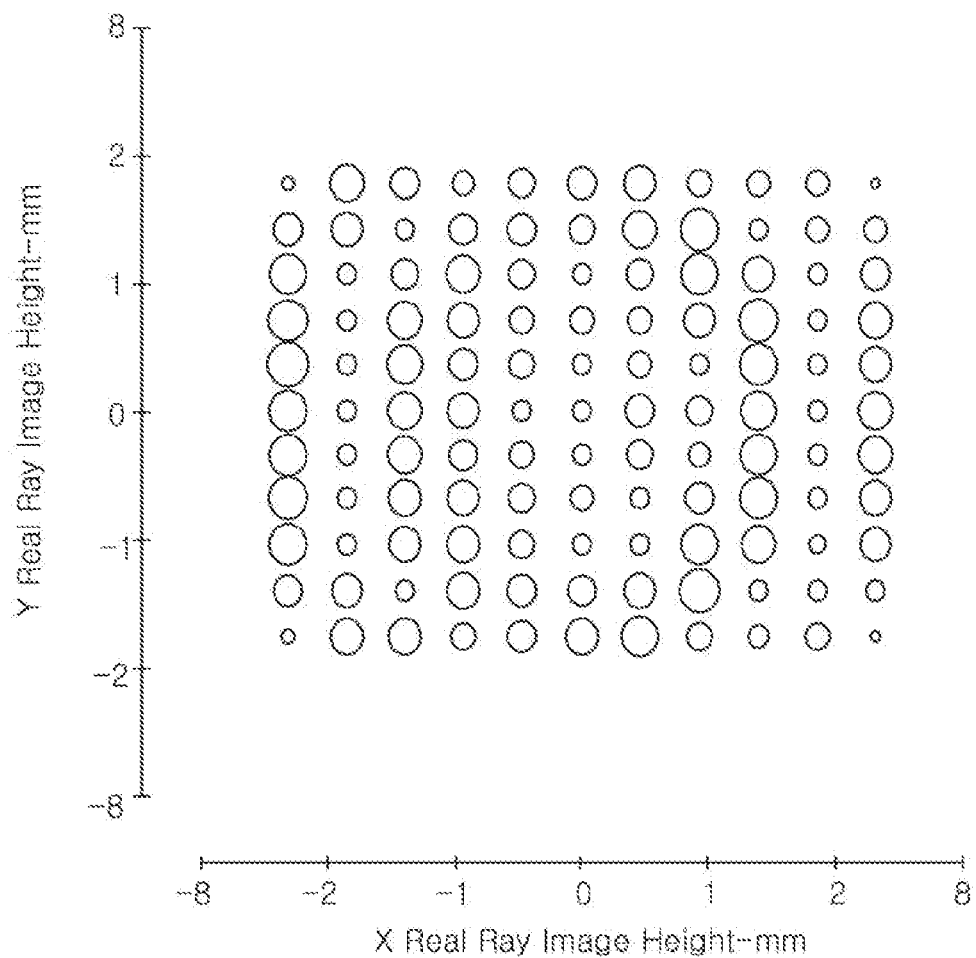
FIG. 6 is a graph illustrating distortion aberration of the optical imaging system according to the third example.

Lens characteristics of the optical imaging system 300 according to the third example are listed in Table 5, aspherical values of the optical imaging system 300 according to the third example are listed in Table 6, and FIG. 6 is a view illustrating aberration curves of the optical imaging system 300 according to the third example.

TABLE 5

| Surface No. | Note | Radius of Curvature | Thickness/ Distance | Refractive Index | Abbe Number |
|---|---|---|---|---|---|
| S1 | Prism | infinity | 2.6300 | 1.722 | 29.500 |
| S2 | | infinity | 2.6300 | | |
| S3 | | infinity | 4.8271 | | |
| S4 | First Reflection Member | −61.383 | 5.8405 | 1.298 | 100.000 |
| S5 | | infinity | 5.8405 | | |
| S6 | Second Reflection Member | 37.975 | 5.0000 | 1.298 | 100.000 |
| S7 | | infinity | 1.5000 | | |
| S8 | First Lens | 5.009 | 2.4279 | 1.534 | 55.650 |
| S9 | | −6.038 | 0.0300 | | |
| S10 | Second Lens | −7.601 | 0.2500 | 1.615 | 25.960 |
| S11 | | 6.79 | 1.7548 | | |
| S12 | Third Lens | 5.673 | 0.5525 | 1.670 | 19.240 |
| S13 | | 10.37 | 2.9827 | | |

TABLE 5-continued

| Surface No. | Note | Radius of Curvature | Thickness/ Distance | Refractive Index | Abbe Number |
|---|---|---|---|---|---|
| S14 | Fourth Lens | 18.246 | 0.4442 | 1.615 | 25.960 |
| S15 | | 115.25 | 1.5579 | | |
| S16 | Fifth Lens | −3.714 | 0.2000 | 1.544 | 56.110 |
| S17 | | 117.467 | 3.4949 | | |
| S18 | Third Reflection Member | infinity | 6.2302 | | |
| S19 | Filter | infinity | 0.2800 | 1.519 | 64.200 |
| S20 | | infinity | 4.4694 | | |
| S21 | Imaging Plane | infinity | −0.0021 | | |

TABLE 6

| Surface No. | S8 | S9 | S10 | S11 | S12 |
|---|---|---|---|---|---|
| K | 0.6859399 | 0 | 0 | 0 | 0 |
| A | 0.0004403 | 0.0000076 | −0.0036587 | −0.0024304 | 0.0003933 |
| B | −0.0000149 | 0.0003737 | 0.0011680 | 0.0005014 | −0.0001823 |
| C | −0.0000019 | −0.0000650 | −0.0001892 | −0.0000640 | 0.0000365 |
| D | 0.0000008 | 0.0000049 | 0.0000136 | 0.0000016 | −0.0000025 |
| E | 0.0000000 | −0.0000001 | −0.0000003 | 0.0000001 | 0.0000000 |

| Surface No. | S13 | S14 | S15 | S16 | S17 |
|---|---|---|---|---|---|
| K | 0 | 0 | 0 | 0 | 0 |
| A | −0.0013467 | −0.0046307 | 0.0035661 | 0.0152888 | 0.0012432 |
| B | 0.0000625 | −0.0033710 | −0.0057502 | −0.0205293 | −0.0127683 |
| C | −0.0000048 | 0.0016937 | 0.0026297 | 0.0063692 | 0.0038696 |
| D | 0.0000007 | −0.0003354 | −0.0005000 | −0.0008241 | −0.0004879 |
| E | −0.0000001 | 0.0000240 | 0.0000376 | 0.0000408 | 0.0000232 |

Optical characteristics and conditional expression values of the optical imaging systems according to the first to third examples are listed in Tables 7 and 8.

TABLE 7

| Note | First Example | Second Example | Third Example |
|---|---|---|---|
| fm1 | 27.3800 | 33.0500 | 30.6900 |
| fm2 | −15.6600 | −20.0900 | −18.9900 |
| f1 | 5.4170 | 5.119 | 5.5488 |
| f2 | −6.2905 | −4.9711 | −5.7930 |
| f3 | 23.5878 | 12.7891 | 17.8336 |
| f4 | 21.8528 | −76.918 | 35.1874 |
| f5 | −3.9764 | −10.1294 | −6.6135 |
| TL | 13.5010 | 13.4864 | 24.6724 |
| f | 31.6000 | 25.0000 | 30.0000 |
| fL | 18.4600 | 15.2000 | 18.5450 |

TABLE 8

| Conditional Expression | First Example | Second Example | Third Example |
|---|---|---|---|
| TL/f | 0.42725 | 0.53946 | 0.82241 |
| f/fL | 1.71181 | 1.64474 | 1.61769 |
| f/fm1 | 1.15413 | 0.75643 | 0.97752 |
| f/fm2 | −2.01788 | −1.24440 | −1.57978 |
| fL/fm1 | 0.67421 | 0.45991 | 0.60427 |
| fL/fm2 | −1.17880 | −0.75660 | −0.97657 |
| |fm1/fm2| | 1.74840 | 1.64510 | 1.61611 |
| f/f1 | 5.8335 | 4.8838 | 5.4066 |
| f/f2 | −5.0234 | −5.0291 | −5.1787 |
| f/f3 | 1.3397 | 1.9548 | 1.6822 |
| f/f4 | 1.4460 | −0.3250 | 0.8526 |
| f/f5 | −7.9469 | −2.4681 | −4.5362 |
| f/f12 | 1.75100 | 1.22400 | 1.19200 |
| f/f345 | −2.81800 | 2.58160 | −0.54800 |

As described above, an image of a long-range subject may be captured and a camera module may be miniaturized.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is to be defined not by the detailed description, but by the claims and their equivalents, and all variations within the scope of the claims and their equivalents are to be construed as being included in the disclosure.

What is claimed is:

1. An optical imaging system, comprising:
   a first lens, a second lens, a third lens, a fourth lens, and a fifth lens disposed in order from an object side toward an imaging plane; and
   a first reflection member and a second reflection member, disposed on an object side of the first lens, each of the first reflection member and the second reflection member having a freeform surface,
   wherein the third lens has a convex object-side surface, and
   wherein the optical imaging system comprises a total of five lenses.

2. The optical imaging system of claim 1, wherein the first reflection member has a concave reflective surface.

3. The optical imaging system of claim 1, wherein the second reflection member has a convex reflective surface.

4. The optical imaging system of claim 1, wherein the first lens has a convex object-side surface.

5. The optical imaging system of claim 1, wherein the fourth lens has a convex object-side surface.

6. The optical imaging system of claim 1, wherein the fifth lens has a concave object-side surface.

7. The optical imaging system of claim 1, wherein:

$1.40 < f/fL < 1.80$, where f is a focal length of the optical imaging system, and fL is a composite focal length of the first to fifth lenses.

8. The optical imaging system of claim 1, further comprising:
an optical path folding member disposed on the object side of the first reflection member.

9. The optical imaging system of claim 1, further comprising:
a third reflection member disposed between the fifth lens and an imaging plane.

10. The optical imaging system of claim 1, wherein:

$0.8 < fm1/f < 1.40$, where fm1 is a focal length of the first reflection member and f is a focal length of the optical imaging system.

11. The optical imaging system of claim 1, wherein:

$-1.0 < fm2/f < -0.40$, where fm2 is a focal length of the second reflection member and f is a focal length of the optical imaging system.

12. The optical imaging system of claim 1, wherein:

$1.40 < |fm1/fm2| < 1.80$, where fm1 is a focal length of the first reflection member, and fm2 is a focal length of the second reflection member.

13. The optical imaging system of claim 1, wherein:

$0.40 < TL/f < 0.9$, where TL is a distance from an object-side surface of the first lens to an imaging plane and f is a focal length of the optical imaging system.

14. An optical imaging system, comprising:
a reflection element, disposed between a lens group and an optical path folding member, and configured to bend an optical path between the optical path folding member and the lens group,
wherein the reflection element comprises a first reflection member having positive refractive power and a second reflection member having negative refractive power,
wherein the lens group comprises a first lens having positive refractive power, a second lens, and a third lens having a convex object-side surface, and
wherein each of the first reflection member and the second reflection member has a freeform surface, and
wherein the optical imaging system comprises a total of five lenses.

15. The optical imaging system of claim 14, wherein the second lens has negative refractive power.

* * * * *